United States Patent [19]
Reed

[11] 4,065,854

[45] Jan. 3, 1978

[54] DIMENSIONAL GAUGING APPARATUS

[76] Inventor: Donald M. Reed, 49 Mountain Road, Tariffville, Conn. 06081

[21] Appl. No.: 727,766

[22] Filed: Sept. 29, 1976

[51] Int. Cl.² ............................................. G01B 3/30
[52] U.S. Cl. .............................. 35/168 R; 33/181 AT
[58] Field of Search .......... 33/168 R, 174 H, 180 AT, 33/181 AT

[56] References Cited

U.S. PATENT DOCUMENTS

| 450,065 | 4/1891 | Fontaine | 33/168 R |
|---|---|---|---|
| 1,649,259 | 11/1927 | Schmitz | 33/168 R |
| 1,779,812 | 10/1930 | Hastings | 33/168 R |
| 2,851,569 | 9/1958 | Potter | 33/181 AT |
| 3,501,843 | 3/1970 | Bandimere | 33/168 R |

*Primary Examiner*—Richard E. Aegerter
*Assistant Examiner*—Richard R. Stearns
*Attorney, Agent, or Firm*—McCormick, Paulding & Huber

[57] ABSTRACT

A dimensional gauging apparatus has a blade bearing generally flat and parallel gauging surfaces which establish the gauge thickness and are positioned within an adjustable clearance gap in a gauging operation. The blade is shaped or provided with a dead weight to cause the gauge when captured between two objects forming the gap to move or topple as the gap is opened to the gauge thickness. At least one of the parallel surfaces establishing the gauge thickness may be situated within a recess which captures the blade between the two objects. Multiple pairs of parallel surfaces may be provided on one blade member for setting gaps of different sizes.

5 Claims, 7 Drawing Figures

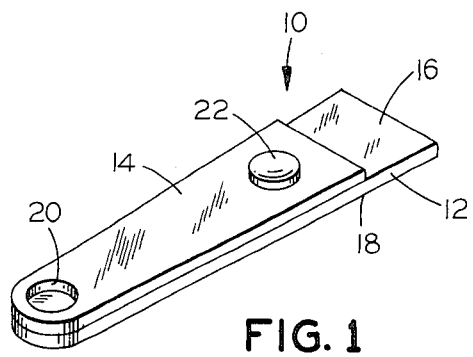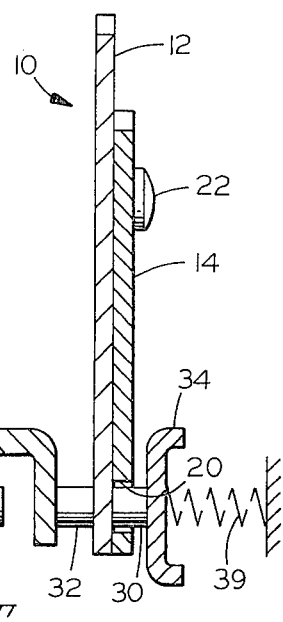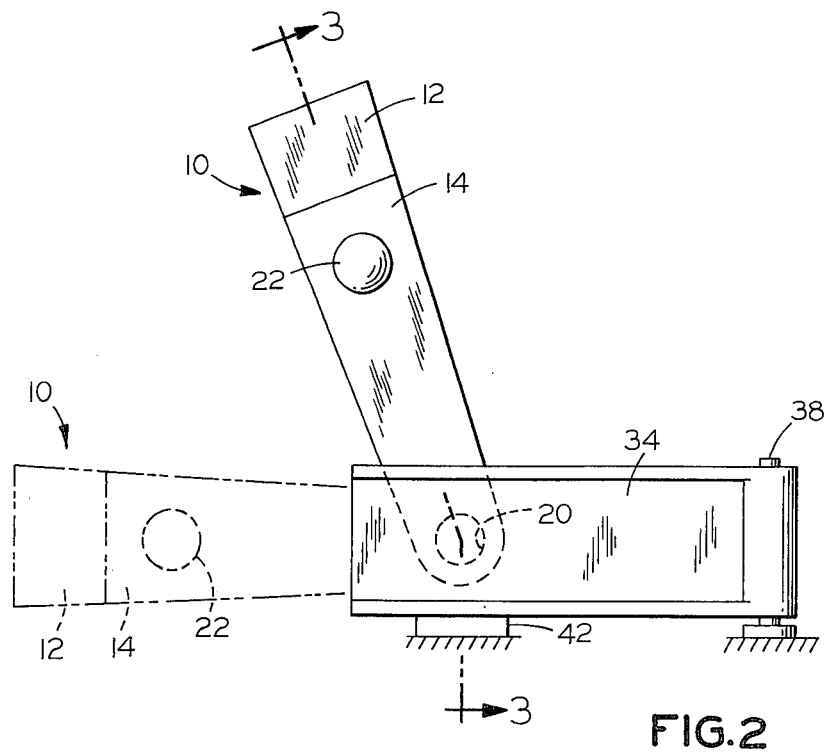

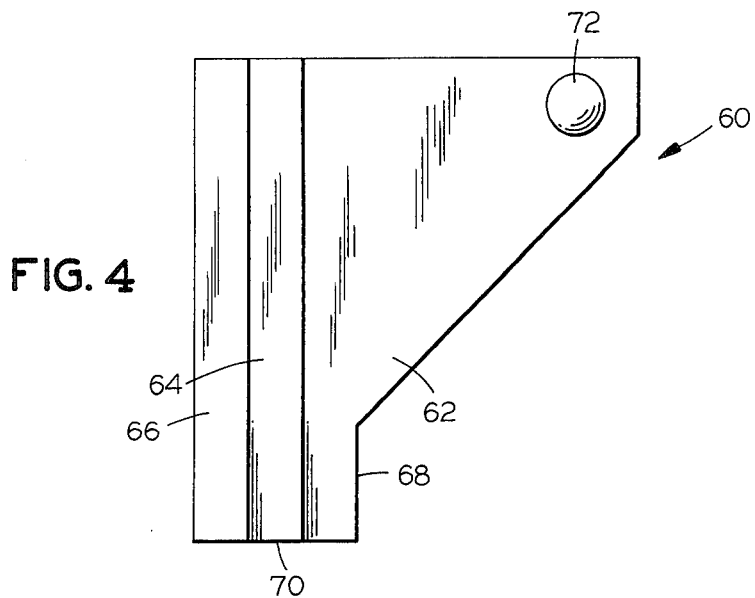
FIG. 4
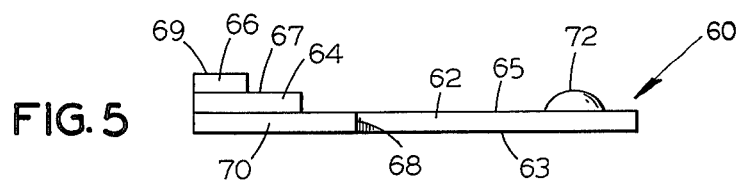
FIG. 5
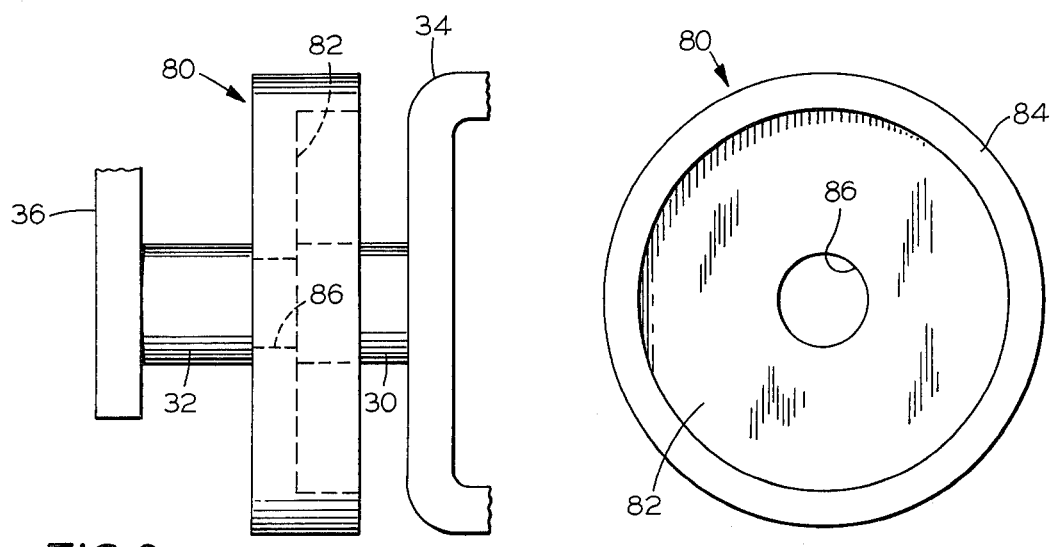
FIG. 6
FIG. 7

DIMENSIONAL GAUGING APPARATUS

BACKGROUND OF THE INVENTION

The present invention relates to measuring instruments and is concerned more particularly with dimensional gauging apparatus of the type utilized to set clearance gaps between adjustable objects such as the contact points of an automotive ignition system.

It is well known in the art to utilize a flat mechanical "feeler" gauge to set or measure the clearance gap between two adjustable positionable objects. Such objects may be the contact points of an automotive ignition system, the valve clearance in a mechanical valve actuating linkage and similar mechanisms where a small but relatively precise gap is required. Feeler gauges used for this purpose are generally formed of a blade having a predetermined thickness between parallel, outwardly facing surfaces which establish the gauge thickness.

It is a general object of the present invention to disclose a dimensional gauging apparatus similar to a feeler gauge but providing greater accuracy and repeatability in gauging operations by virtue of its improved construction.

SUMMARY OF THE INVENTION

The present invention resides in a dimensional gauging apparatus for setting a clearance gap between two opposed objects which are adjustably positionable relative to one another.

The apparatus is comprised of a blade having two generally parallel gauging surfaces which are separated from one another by a known amount defining a predetermined gauge thickness. Such thickness corresponds to the desired dimension to which a clearance gap is set in a gauging operation.

In one embodiment of the invention, at least one of the parallel gauging surfaces is situated in a recess which is sized and shaped to receive one of the objects when the gap between the objects is within a limited range of the gauge thickness. The recess holds the gauge captured between the objects within this range and permits movement or toppling of the gauge to be detected as the dimension of the gap is increased to the gauge thickness.

The blade may also have an elongated configuration with the parallel gauging surfaces situated adjacent one end and a dead weight attached to the opposite end. The dead weight generates a toppling moment about the gauging end of the blade to more clearly establish movement at the desired gap dimension. A complete set of blades is preferably designed with weight distributions providing the same moment for uniform gauging operations. If desired, multiple pairs of parallel gauging surfaces may be provided on a single blade with each pair of surfaces defining different blade thicknesses. The blades may have laminated constructions and a through-hole may be provided with the recessed gauging surfaces to eliminate the accumulation of dirt.

BRIEF DESCRIPTION OF THE DRAWINGS

FIG. 1 is a perspective view illustrating one embodiment of the dimensional gauging apparatus of the present invention.

FIG. 2 is a side elevation view of the apparatus in FIG. 1 and illustrates the manner in which the apparatus is used in setting the clearance gap between two contacts.

FIG. 3 is a sectional view of the apparatus in FIG. 2 as viewed along the sectioning line 3—3.

FIG. 4 is a plan view showing an alternate embodiment of the gauging apparatus having multiple pairs of gauging surfaces.

FIG. 5 is a front elevation view of the apparatus in FIG. 4.

FIG. 6 is a side elevation view of still another embodiment of the gauging apparatus and shows the manner of using the apparatus of a gauging operation.

FIG. 7 is an axial end view of the gauging apparatus in FIG. 6.

DESCRIPTION OF THE PREFERRED EMBODIMENTS

FIG. 1 illustrates one embodiment of the gauging apparatus of the present invention taking the form of an elongated blade 10. The blade has a laminated construction and is comprised of a base or gauging laminate 12 and a capturing laminate 14. The gauging laminate 12 is preferably formed from a strip of metal having two oppositely disposed and parallel surfaces 16 and 18 which define a predetermined gauge thickness corresponding to the desired dimension of a gap which is set by the blade. The capturing laminate 14 is bonded, welded or otherwise fixedly secured to the gauging laminate 12. The laminate 14 has an aperture 20 at one end and is positioned on the laminate 12 so that the aperture exposes the gauging surface 16 and, therefore, defines a recess in the blades through which access to the gauging surface may be had.

A dead weight 22 is fixedly attached to the laminate 14 at the end opposite the aperture 20 by a bonding or other process, and the weight is preferably situated as far from the aperture as possible to establish a moment about the end of the blade bearing the recess.

FIGS. 2 and 3 illustrate the manner of using the blade 10 in a gauging operation. For purposes of explanation, it is assumed that the blade 10 is utilized to establish the clearance gap between two contacts 30 and 32 which are breaker points in the ignition system of an automobile.

The contact 30 is mounted on an arm 34 pivotally mounted on a post 38, and the arm is pivoted or moved in synchronism with the engine cycle and in opposition to the spring 39 by means of a cam (not shown). The contact 32 is mounted on an adjustable bracket 36 and is adjusted in oppositely disposed relationship toward or away from the contact 30 to vary the gap between the contacts. To this end, the bracket 36 is supported on an adjustment screw 40 threadably engaged with a fixed bracket 42. A coil spring 44 is interposed between the fixed and adjustable brackets and holds the adjustable bracket against the head of the screw 40 at all times. The adjustable bracket 36 is not threadably engaged with the screw 40 and is prevented from rotating with the screw by means of the fixed bracket 42. Therefore, rotation of the screw 40 moves the adjustable bracket 36 axially with the screw and causes the contact point 32 to be shifted toward and away from the contact 30.

During a gauging operation, the arm 34 is pivoted about the post 38 to open the gap between the contacts 30 and 32, and the gauging end of the blade 10 having the aperture 20 is inserted into the gap. The arm 34 is then permitted to pivot toward a closed position under the influence of the spring 39 so that the contacts are brought closer together. As the contacts close, the blade 10 is manipulated so that the contact 30 is received in the aperture 20 as illustrated in FIG. 3. The adjusting screw 40 is set so that the contacts 30 and 32 are initially closer than the gauge thickness established by the gauging surfaces of the laminate 12 and therefore press against the gauging surfaces. Friction generated between the contacts and the surfaces then holds the blade 10 in an elevated position such as shown in FIG. 2.

The adjustment screw 40 is then rotated to withdraw the contact 32 away from the contact 30 and as the dimension of the gap reaches the gauge thickness, that is the thickness of the gauging laminate 12, friction forces produced by the contacts 30 and 32 are lost and the blade 10 topples under the moment of its own weight as illustrated in phantom in FIG. 2.

The toppling of the blade 10 is a clear indication that the gap between the contacts 30 and 32 has been set at the predetermined gauge thickness. Since it is the weight distribution of the blade which causes the toppling moment, a highly accurate and repeatable setting of the contacts is obtained. Uniform adjustment of various contact points at different gap settings can be obtained with a set of the blades 10 in which the gauge thicknesses of the laminates 12 differ by predetermined or graduated amounts. The weights 22 in the set of blades are preferably selected to cause the toppling moments of the various blades in the set to be equal for uniformity and consistency in setting various gaps between contacts.

Once a blade has toppled and indicated that the proper clearance has been reached, the aperture 20 in the laminate 14 keeps the blade captured between the contacts. Even if the gap adjustment is increased within a limited range from the gauge thickness, the blade will not fall out because of the contact 30 engaged with the aperture.

FIGS. 4 and 5 disclose another embodiment of the dimensional gauging apparatus for setting clearance gaps between two adjustable objects such as the contacts 30 and 32 shown in FIGS. 2 and 3. This embodiment has a blade 60 with a laminated construction at one end formed by a base leaf 62 of a known gauging thickness, a second laminate 64 having a known gauging thickness and being bonded to the base laminate 62 and a third laminate 66 also having a known gauging thickness and bonded to the second laminate directly opposite the base laminate. By stacking the various laminates in this fashion, multiple pairs of gauging surfaces are developed by the three laminates. For example, in the illustrated embodiment, three different gauge thickness are provided between the respective pairs of surfaces comprised by the completely exposed or bottom surface 63 of the laminate 62 in FIG. 5 and the upper surfaces 65, 67 and 69 of the three laminates. Thus, three different gauge thicknesses are provided by the blade 60.

The base laminate 62 has a generally L-shape which defines a gauging end or section on a projection 68 where all three of the laminates and corresponding gauge thicknesses appear. Preferably, the edges of the laminates along the side 70 of the projection 68 are bevelled or feathered to facilitate insertion of the gauges within the gaps to be adjusted.

A weight 72 is connected to the opposite end of the L-shape configuration remote from the gauging end to generate a greater toppling moment about the projection 68 during a gauging operation. Thus, the blade 60 may be used in substantially the same fashion as the blade in FIGS. 1-3 to produce accurate and repeatable gap dimensions. A plurality of the blades 60 may be provided as a set with graduated gauge thicknesses over a specified range of interest. It will be understood that the number of the blades 60 required in a set to cover a given range of gap settings is smaller than the number of blades 10 in FIGS. 1-3 for the same range.

FIGS. 6 and 7 illustrate still another embodiment of the dimensional gauging apparatus for setting the clearance gaps between objects such as the contacts 30 and 32. This embodiment is comprised by a gauge 80 having a generally annular configuration with a circular base 82 having a predetermined gauge thickness and a cylindrical wall 84 integrally connected with the base periphery. The gauge 80 thus has a cap-shape with one of the gauging surfaces on the base 82 situated within a recess defined by the wall 84. The inside diameter of the wall 84 is selected to fit loosely over a contact such as the contact 30 to capture the gauge between the contacts within a limited range of adjustment and to permit the gauge to slip or drop between the contacts as the clearance gap between the contacts reaches the predetermined gauge thickness. Thus, friction holds the gauge to between the contacts until the precise adjustment of the contacts has been made, and motion of the gauge signals the correct setting.

The base 82 of the gauge 80 includes a central throughhole 86 which accommodates any deposits or build-up on the electrodes being set. The aperture also prevents dirt and other contaminates from filling the recess formed by the cylindrical wall 84 and interfering with gap measurements at the gauge dimension.

While the present invention has been described in several embodiments, it will be understood that numerous modifications and substitutions can be had without departing from the spirit of the invention. For example, the blade 10 in FIGS. 1-3 need not necessarily have a laminated construction and may be formed by a single leaf of material in which the recess 20 is cut and to which the weight 22 is added. A through-hole similar to the hole 86 illustrated in the embodiment of FIGS. 6 and 7 may also be provided within the recess of the blade 10. Recesses may also be provided in each of the graduated steps formed by the laminates 62, 64 and 66 of the blade 60 in FIGS. 4 and 5 to insure that the gauge remains captured in the clearance gap during a gauging operation. Accordingly, the present invention has been described in several embodiments by way of illustration rather than limitation.

I claim:

1. A dimensional gauging apparatus for setting a gap between two opposed objects adjustably positionable relative to one another comprising: a blade having an elongated shape between two opposite blade ends and in at least one section thereof adjacent one of the blade ends two generally parallel surfaces defining a predetermined gauge thickness corresponding to the desired dimension of a gap between the adjustably positionable objects, at least one of the parallel surfaces being situated in a recess of the blade, the recess having a size and shape selected to loosely receive one of the objects whereby the blade is captured in the gap between the objects by the recess within a limited range of gap adjustment of the objects from the predetermined gauge thickness and the blade in the captured position can topple due to the weight of the blade distributed between the opposite blade ends as the gap adjustment is made greater than the predetermined gauge thickness.

2. A dimensional gauging apparatus as defined in claim 1 wherein the blade includes an added weight attached adjacent the end opposite the one section containing the recess and parallel surfaces.

3. A dimensional gauging apparatus as defined in claim 1 further including a plurality of said blades comprising a gauging set, each blade of the set having a different gauge thickness between the parallel surfaces and the blade thicknesses being graduated.

4. A dimensional gauging apparatus as defined in claim 3 wherein each blade of the set is an elongated blade having the parallel surfaces defining the gauge thickness situated adjacent one end of the blade and every blade of the set has a weight distribution along the elongated blade length selected to produce substantially the same moment about said one end.

5. A dimensional gauging apparatus for setting clearance gaps between two adjustable objects comprising: a blade member having a generally flat body with two remotely located ends, one of the ends being a gauging end and having a pair of generally flat, parallel gauging surfaces facing outwardly of the blade member and separated by a predetermined amount establishing the gauge thickness, at least one of the generally flat, parallel surfaces being situated within a recess at the gauging end of the blade, the other of the ends having a dead weight attached fixedly to the member for generating a moment about the gauging end during a gauging operation.

* * * * *